US009780398B1

(12) United States Patent
Woodall et al.

(10) Patent No.: US 9,780,398 B1
(45) Date of Patent: Oct. 3, 2017

(54) SELECTIVELY LOCATABLE POWER GENERATION SYSTEM EMPLOYING A WATER SPLITTING PROCESS

(71) Applicants: Jerry M. Woodall, Davis, CA (US); Thomas E. Rowley, San Jose, CA (US)

(72) Inventors: Jerry M. Woodall, Davis, CA (US); Thomas E. Rowley, San Jose, CA (US)

(*) Notice: Subject to any disclaimer, the term of this patent is extended or adjusted under 35 U.S.C. 154(b) by 0 days.

(21) Appl. No.: 15/154,173

(22) Filed: May 13, 2016

Related U.S. Application Data

(60) Provisional application No. 62/160,781, filed on May 13, 2015.

(51) Int. Cl.
H01M 8/06 (2016.01)
H01M 8/0606 (2016.01)
B01J 19/24 (2006.01)
C01B 3/08 (2006.01)
F24F 5/00 (2006.01)
F28D 20/02 (2006.01)

(52) U.S. Cl.
CPC .......... H01M 8/0606 (2013.01); B01J 19/24 (2013.01); C01B 3/08 (2013.01); F24F 5/0014 (2013.01); F28D 20/02 (2013.01); B01J 2219/00094 (2013.01); H01M 2250/10 (2013.01); H01M 2250/20 (2013.01)

(58) Field of Classification Search
CPC .. H01M 8/0606; H01M 8/065; H01M 8/0662; H01M 2250/10; H01M 2250/20; C01B 3/08; F24F 5/0014; F28D 20/02
See application file for complete search history.

(56) References Cited

U.S. PATENT DOCUMENTS 9,700,870 B2 * 7/2017 Santilli .................... B01J 19/12
2013/0276769 A1 10/2013 McKay
2015/0360941 A1 12/2015 McRae
2015/0376801 A1 * 12/2015 Bairamijamal ...... B01D 53/002
204/257

* cited by examiner

Primary Examiner — Raymond Alejandro
(74) Attorney, Agent, or Firm — John P. Costello; Costello Law Corp.

(57) ABSTRACT

The invention is a power generation system which involves a water-splitting reaction employing metal feedstock to generate heat, hydrogen and metal hydroxide. The heat produced by the power generation system supplies a Heating-Ventilation-Air Conditioning (HVAC) system for heating and cooling building structures, such as homes, kiosks, commercial buildings and greenhouses. The hydrogen gas component produced by the invention is sufficient to fuel a fuel cell vehicle (FCV) and a fuel cell, which provides electricity to an associated building structure. The invention can be located on-site with a building structure and provides a readily available FCV fueling station associated with the building structure where an FCV is located.

24 Claims, 3 Drawing Sheets

SELECTIVELY LOCATABLE POWER GENERATION SYSTEM EMPLOYING A WATER SPLITTING PROCESS

RELATED APPLICATIONS

This application claims the benefit of U.S. Provisional Ser. No. 62/160,781, filed on May 13, 2015.

TECHNICAL FIELD

This invention relates to the field of alternative energy and more specifically to a power generation system for occupied and non-occupied building structures which employs a solid metal feedstock to generate heat, hydrogen and metal oxide product.

BACKGROUND

It has always been an elusive goal to provide a building structure, such as a house, with the ability to meet all of its energy needs as well as fuel vehicles, on-site, in a self-sufficient manner. True "off the grid" living would imply that a power generation system would provide all necessary energy needs: heating, cooling, electricity and fuel for vehicles without utility hookups or the need to travel to a remote fueling station.

Solar energy has held some promise with regard to providing an alternative electrical power source for buildings. However, the level of production from a bank of solar panels falls short with regard to providing all of the energy needs of a household and for fueling vehicles. The advantages of solar is that it is an abundant source of energy that is available throughout the world and it is sustainable. The drawbacks of solar power systems is that they are expensive without the infusion of government subsidies; solar energy is intermittent, depending on weather; energy storage is expensive as batteries must be relied upon; and solar panel production is not pollution-free as manufacturing processes related to solar panels are associated with greenhouse gas emissions.

Fossil fuels cannot be produced and refined on site for a typical household, so fossil fuels are not practical for achieving true self-sufficiency in the energy realm. In fact, as the world tries to wean itself off fossil fueled motor vehicles, three disparate technologies have emerged. The current leading technologies are hybrid electric vehicles (HEVs), pure electric vehicles (EVs), and fuel cells vehicles (FCVs).

The predominant embodiment of most HEVs is to have a battery supply the startup power and supply power in and around town, and a gasoline internal combustion engine (ICE) supply power to a dynamo which powers both electric motors that turn the wheels for highway driving, and also keep the batteries charged for the next startup or in-town driving. Thus, even though the EV part of the HEV does not directly contribute much power to the vehicle, it allows the ICE to run at nearly constant speed. As a result the ICE efficiency is greatly improved and the resulting mpg rating is much higher than for purely ICE vehicles.

There is considerable effort devoted towards realizing a pure EV. The current well known examples are the Tesla® EV and Nissan Leaf® EV. As a result of being purely EV, they are very efficient; being able to convert electricity to electric motor power at an efficiency of >85%. The main drawback with EVs is that the energy density (energy per unit weight) of the currently preferred Li-ion battery is less than 5% than that for gasoline. Also, Li-ion batteries have over their lifespan an effective cost of between $2-$4 per kilowatt-hour (KWH), whereas, gasoline only costs 9 cents per KWH. Thus, to be economically viable, the Tesla® S only has a 200 mile range per charge, and the Leaf® only an 80+ mile range. Hence, unless a dramatic breakthrough happens in battery technology, the current EV market, without subsidies, will be only a niche market.

As a result of this apparent saturation in EV performance, there has been a renewed interest in the FCV approach. An FCV also supplies electricity to power an electric motor via a battery. However, the FCV battery is called a fuel cell (FC), which operates by removing an electron from a hydrogen atom at one electrode, which becomes a positively charged hydrogen ion. This ion moves through an ion conductor to the other electrode where it combines with OH— ion to become H2O, i.e. water. Meanwhile, the electron removed from the original hydrogen atom moves through a circuit doing work, e.g. running a motor. When this electron gets to the other electrode it reaction with oxygen and water to form the OH— ion that reacts with the hydrogen ion that has passed through the ionic conductor to form water. Note that for a FC there are no electrode-metal reactions as there are for a lead-acid battery. Hence, a FC should last as long as the ion conducting membrane is intact.

As of 2014, there are ≈>1000 FCVs being tested by consumers. So far a major drawback to practical operation of an FCV is the lack of abundant and conveniently located hydrogen filling stations. There are only a few located at or near major cities. This means that until there is a hydrogen supply chain (e.g. a hydrogen highway), buyers of FCVs will need to live near major cities to be able to drive and refill the tank. Furthermore, the specifications for an ideal FCV is that it will have a range of 300-400 miles and require 4 Kg of hydrogen gas to power the FCV to realize that mileage.

However, there is a major barrier to developing a critical number of filling stations. The current preferred method is to heat methane (natural gas), a fossil fuel, in steam, to generate hydrogen gas and carbon dioxide (a greenhouse gas associated with climate change). As a result most hydrogen is made at a site remote to the filling station and must be transported by truck to storage containers (a hazardous operation). From the storage containers the hydrogen must be compressed to a pressure of 10,000 psi when delivered to the filling station and introduced into the FCV at this high pressure. The pumps for doing this are very expensive and need to have intensive, short term maintenance to keep them operational.

The range of FCVs is comparable to the range of many ICE vehicles and therefore makes them a practical and reliable subject for further development as an emissions-free vehicle of the future. The main drawback relates to the present solution for hydrogen production and delivery, as well as the dearth of fueling stations. The present invention solves these major drawbacks by providing a system for generating power which can heat and cool a building structure, serve its electrical needs and also manufacture hydrogen fuel on-site to fulfill the fueling needs of FCVs. This aspect of selectively locating the system at a building structure where an FCV is kept solves the problem of a dearth of fueling stations, and the system provides power for both the building structure and associated vehicles which is a total power solution and the realization of true "off the grid" performance.

The foregoing reflects the state of the art of which the inventors are aware, and is tendered with a view toward discharging the inventors' acknowledged duty of candor, which may be pertinent to the patentability of the present invention. It is respectfully stipulated, however, that the foregoing discussion does not teach or render obvious, singly or when considered in combination, the inventors' claimed invention.

SUMMARY OF THE INVENTION

The invention is a power generation system which employs metal feedstock to generate heat, hydrogen and metal hydroxide. The heat produced by the power generation system supplies a Heating-Ventilation-Air Conditioning (HVAC) system for heating and cooling building structures, such as homes, kiosks, commercial buildings and greenhouses.

The hydrogen gas component produced by the invention is sufficient to fuel an FCV on an ongoing basis. Therefore, the current invention eliminates the need for an extensive network of hydrogen filling stations located within large population centers, thus reducing the need to transport and store hydrogen, and pressurize it to 10,000 psi. The invention locates hydrogen production where is used, e.g. at a "home" hydrogen filling station, for those who own an FCV. Also this invention has as an objective to generate the hydrogen at a high pressure that is needed to transfer the hydrogen directly to the fuel tank of an FCV.

The power generation system also generates valuable metal end-products. If aluminum metal is used as a feedstock, aluminum hydroxide is created which can be converted to alumina ($AL_2O_3$), a highly valuable end-product. Alumina has a readily available market and this fact allows the system to generate energy at a cost that is competitive with other sources of hydrogen.

In one embodiment, the power generation system, is based on the preferred reaction using aluminum or magnesium feedstock as described in the expired U.S. Pat. No. 4,358,291, incorporated herein by reference.

In another embodiment, the power generation system is based on a reactor employing a wet-side/dry-side design, and employing aluminum feedstock as disclosed in co-pending U.S. patent application Ser. No. 14/514,777, incorporated herein by reference.

The power generation system presents an option for providing self-contained electric power and heating-cooling to a building structure that excludes the need for utility hookups. In another aspect of the invention, hydrogen is produced and pressurized at a level for direct introduction to an FCV, essentially creating a home hydrogen fueling station. The invention can be selectively located in association with any building structure. In the case of homes, the system could provide a total energy solution for lighting, heating and cooling a house as well as providing fuel for an FCV vehicle.

BRIEF DESCRIPTION OF THE DRAWINGS

The invention will be more fully understood by reference to the following drawings which are for illustrative purposes only.

DETAILED DESCRIPTION OF THE PREFERRED EMBODIMENTS

The power generation system of the present invention is intended to be sited in, or associated close to a building structure, for purposes of providing electricity, as well as heating and cooling to the building structure. Additionally, the system will supply hydrogen gas at high pressure for direct introduction to an FCV via a filling station. A building structure may rely on its entire power needs as well as FCV fueling needs being supplied by the power generation system such that standard utility hookups are unnecessary. The invention is capable of providing true "off the grid" operation for building structures. In another application, the power generation system can provide an alternative power source operating in conjunction with a standard utility hookup, for example, if rolling blackouts or brownouts manifest themselves; the present invention could fill in the gaps in power generation supplied by utility companies. The invention has applications to habitable structures such as homes and commercial buildings, as well as to un-inhabited structures such as autonomous kiosks and green houses.

The added advantage of the inventive power generation system is that it can provide hydrogen fuel to an FCV. An FCV being a form of transportation having a range similar to an ICE, which presents an attractive and realistic alternative form of transportation.

Figure 1:
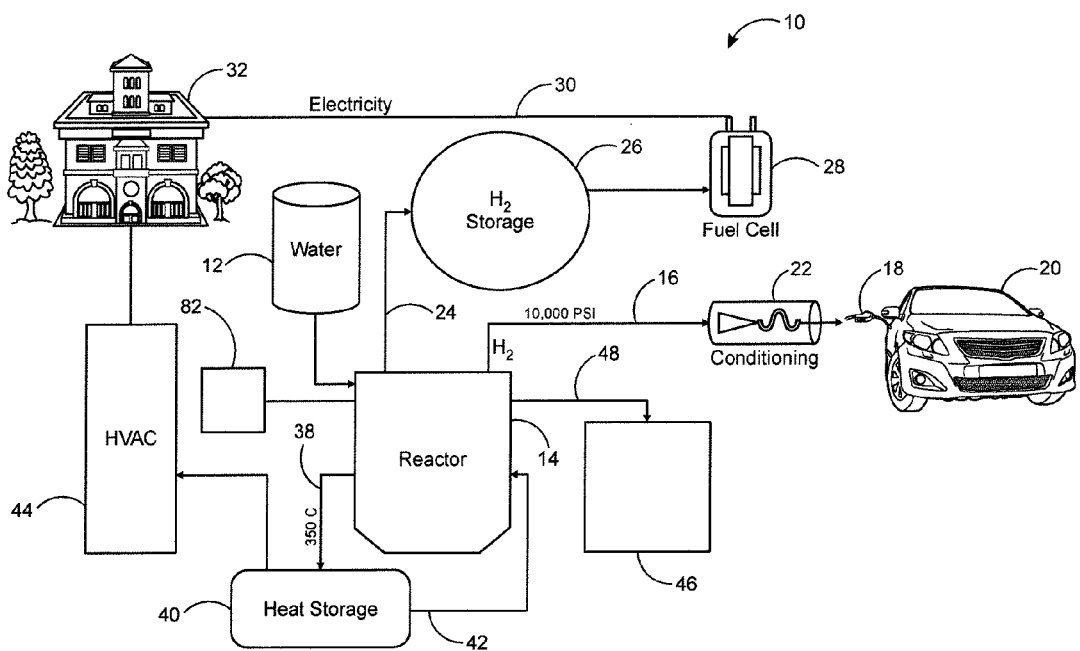
FIG. 1 is a block diagram of an embodiment the inventive power generation system.

Referring now to FIG. 1, the basic components of the system 10 include a water source 12 and a reactor 14 that executes a water-splitting reaction with a solid metal feedstock material. Due to its abundance on Earth, solid aluminum feedstock is readily available. The solid aluminum feedstock can be a strip of aluminum, a rod of aluminum, a pellet of aluminum, a tube of aluminum, granules of aluminum and a powder of aluminum. Additionally the solid aluminum feedstock may be substantially pure aluminum or may contain other materials in the way of impurities or alloys so long as they do not impede the oxidation process and action of the passivating-oxide preventing agent.

A water splitting reaction as described in U.S. Pat. No. 4,358,291, incorporated herein by reference, generates heat, Ultra High Purity (UHP) hydrogen, and Ultra High Purity (UHP) aluminum hydroxide. The reaction products of heat, hydrogen, and aluminum hydroxide are all directed to various peripheral components attached to the reactor 14. For example, a high pressure hydrogen line 16 is coupled to a high pressure FCV fueling station 18 which conditions 22 the hydrogen received from the reactor 14 for introduction directly to an FCV 20. Another hydrogen line 24 from the reactor introduces hydrogen to a storage container 26 which is in turn coupled to a fuel cell 28 which produces electricity 30 for the electric power needs of a building structure 32 associated with the power generation system 10.

Figure 2:
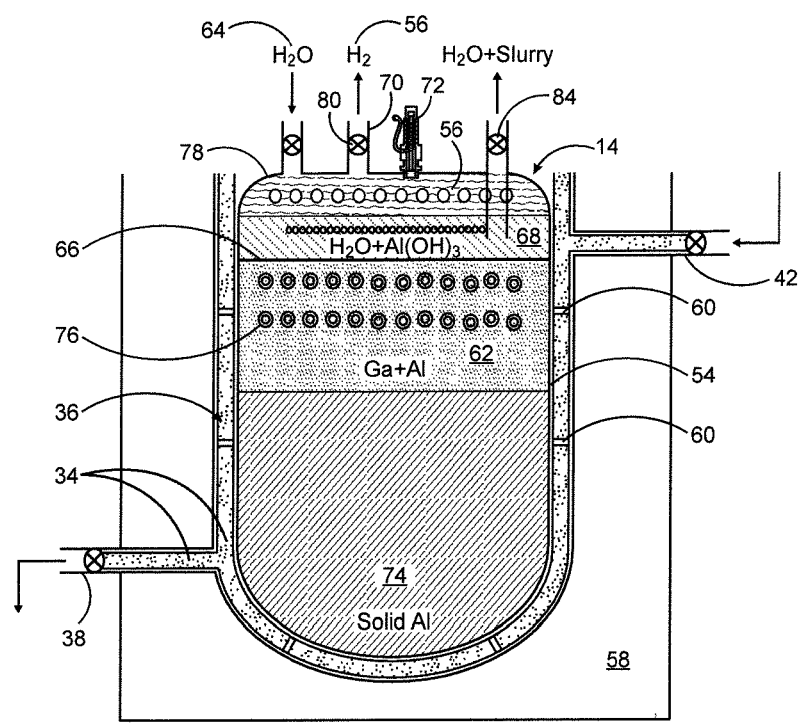
FIG. 2 is a cutaway view of one embodiment of the reactor component of the inventive system, this view showing the reactor fully charged with solid aluminum feedstock and executing a water splitting reaction for generating hydrogen, aluminum hydroxide and heat.

Referring also to FIG. 2, a fluid component 34 is heated in fluid jackets 36 which are in communication with the reactor 14 during the water-splitting reaction. The fluid component 34 absorbs heat produced by the water-splitting reaction occurring inside of the reactor 14. In one embodiment a quantity of 100% (percent) by weight molten Gallium (Ga) operates as a fluid component 34 in accordance with the invention and this molten Ga is piped 38 to a heat storage container 40. The heat storage container 40 must be able to absorb the heat from the molten Ga as it is piped through. The heat storage container 40 is insulated and retains the absorbed heat for long-term usage by an HVAC system.

In one embodiment, the heat storage container 40 comprises a Phase Change Material (PCM) which absorbs the heat from the Ga. The Ga is pumped back to the fluid jackets 36 via a return line 42 after having its heat stripped by the heat storage container 40, in a relatively cooled state. The heat stored in the PCM can be used by an HVAC system, such as a typical forced air heat exchanger or an absorption cooling system associated with a building structure 32 for heating and cooling the structure.

Another line 48 couples the reactor 14 to an aluminum hydroxide storage container 46, which can be pumped regularly and transported to a facility which converts the aluminum hydroxide to valuable UHP alumina off-site.

Figure 3:
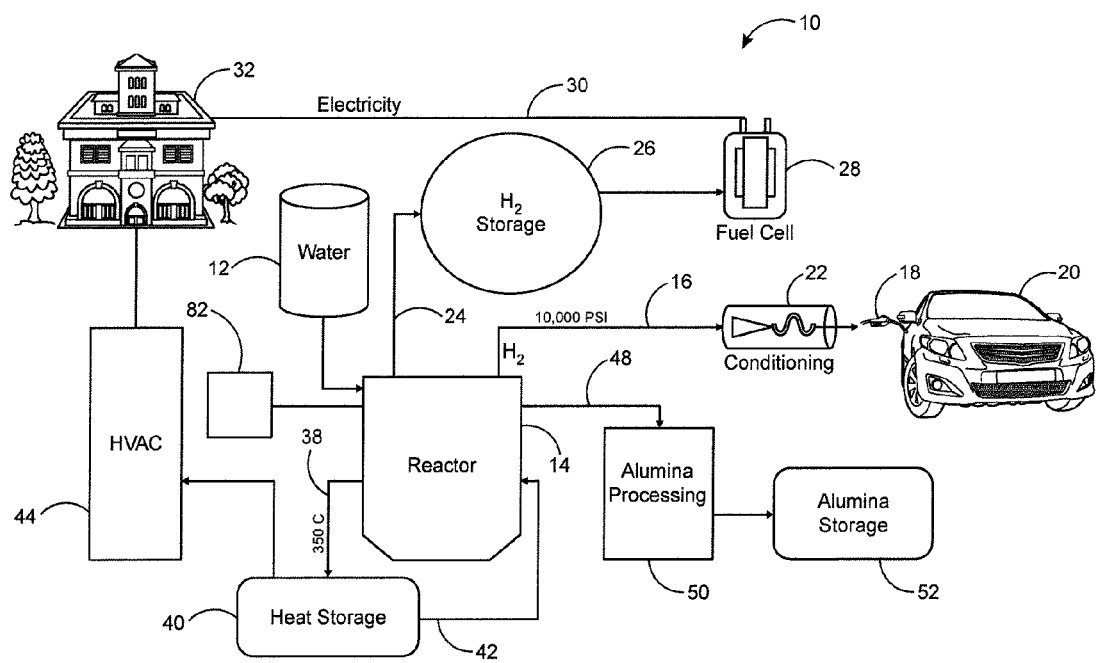
FIG. 3 is a block diagram of another embodiment of the inventive power generation system.

An alternative embodiment of the power generation system is shown in FIG. 3 which shows the alumina processing being carried out on-site wherein the aluminum hydroxide component has undergone dehydration/heating in an alumina processor 50 and is stored in an alumina storage container 52 in the form of (UHP) alumina. In this embodiment, UHP alumina could be sold by an owner of the building structure 32 to offset any hard costs incurred as a result of operating the power generation system 10.

Still referring still to the Figures, if aluminum metal feedstock is used, the reactor carries out a water-splitting reaction which produces hydrogen, aluminum hydroxide and heat as follows:

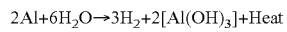

$$2Al+6H_2O \rightarrow 3H_2+2[Al(OH)_3]+Heat$$

The heat from the water-splitting reaction is absorbed by the molten Ga fluid component 34 residing in the fluid jackets 36 adjacent and in communication with the sidewalls 54 of the reactor 14. It is the molten Ga fluid component 34 that is cycled through the heat storage container 40 the heat from the fluid component being absorbed therein by the PCM. An exemplary PCM is NaOH/7.2% $Na_2CO_3$ having an enthalpy of reaction ($\Delta H_f$) of 340 kJ/Kg. To be most useful for applications involving HVAC systems, it has been found that the PCM should be heated to a temperature range of between 200-350° C. by the incoming molten Ga fluid component 34 as it flows through the heat storage container 40. Typically, if the molten Ga fluid component 34 enters the heat storage container 40 at 350° C.; this is sufficient to transfer heat to the PCM and keep it in a range of 200-350° C. An HVAC system recirculates the molten Ga fluid component 34, removes the heat from the molten PCM, and deposits the heat to either a heat exchanger to heat a building structure or to heat the working fluid of an absorption air conditioner whose evaporation cools the room. As the heat is withdrawn from the liquid state of the PCM it will freeze. It gets melted again via withdrawing heat generated by the water splitting process.

The hydrogen product 56 of the water-splitting reaction is directed to a storage container 26, which supplies fuel for a fuel cell 28 which produces electricity for an associated building structure 32, in one instance. In a second instance, the hydrogen 56 is directed to a temperature and pressure conditioning module 22 appropriate for an FCV filling station 18. The water-splitting reaction inside of the reactor advances to a point where the hydrogen is pressurized to a level of 10,000 psi, at which time it can be introduced to the fuel tank of an FCV 20 directly after passing through conditioning module 22.

FIG. 2 illustrates an exemplary reactor 14 for carrying out a sufficient water-splitting reaction to supply the energy needs of a building structure 32 as well as an FCV 20. The reactor 14 is retained in an insulated jacket 58 to maximize heat retention of the power generation system 10. The insulated jacket 58 may be comprised of a ceramic fiber insulation such as Fiberfrax™ insulation manufactured by Thermal Products Company, Inc. A system of detents 60 couples the reactor 14 to a heat exchange fluid jacket 36 located between the reactor sidewall 54 and the insulated jacket 58. The Ga fluid component 34 inside of the fluid jacket 36 is heated by the aluminum saturated Ga liquid melt component 62 inside of the reactor 14 reacting with the water reagent 64 at the water-liquid melt interface 66. Above the interface 66 a water-aluminum hydroxide slurry 68 ($H_2O+Al(OH)_3$) is formed, and the hydrogen component 56 of the water-splitting reaction bubbles out of the slurry 68 to at least one hydrogen pipeline 70, which feeds the hydrogen storage container 26 and FCV filling station 18. At full reaction, the hydrogen reaches a pressure of 5,000 or 10,000 psi (varies by FCV) inside of the reactor 14 which is sufficient for directly feeding into an FCV's hydrogen fuel storage tank. A pressure release valve 72 insures that the hydrogen pressure inside of the reactor does not exceed the required 5,000 or 10,000 psi threshold.

Still referring to FIG. 2, inside of the reactor 14 it is imperative that the water reagent 64 not come into direct contact with the aluminum feedstock 74. Water forms oxides on the surface of aluminum which causes a water-splitting reaction to cease. In the instant example a molten Ga 62 acts as a passivating oxide-preventing reagent to keep the aluminum feedstock 74 from directly contacting the water reagent 64. Molten Ga 62 in contact with solid aluminum feedstock 74 causes the aluminum 76 to diffuse into the molten Ga 62 to the point of saturation. The aluminum 76 dissolved in the molten Ga 62 is consumed at the water-liquid melt interface 66 in a water-splitting reaction without forming an oxide around the aluminum 76 and without shutting the process down. The reaction at the water-liquid melt interface 66, causes a gradient and further diffusion of aluminum 76 from the feedstock 74 until the feedstock 74 is depleted.

If aluminum feedstock 74 is used it has been found that pure 100% molten Ga 62 as a passivating-oxide preventing reagent produces the highest grade UHP hydrogen and UHP alumina. Molten Ga alloys such as Gallium-Indium (Ga—In) (80% Ga-20% In (by weight)) and Gallium-Indium-Tim (Ga—In—Sn) (68% Ga-22% Indium-10% Sn (by weight)) can also be used in the reactor 14, but it is believed that these alloys produce lower grades of hydrogen and alumina product. It is also possible to substitute other metal feedstock for aluminum, if these are available. For example, Magnesium (Mg) dissolved in the molten Ga passivating-oxide preventing reagent produces UHP hydrogen, heat and UHP MgO in a water splitting process.

The system 10 is operated in a sequence of batch operations. Over four weeks, the reactor 14 will produce a weekly charge of 4 kilograms (Kg) of UHP hydrogen, in two batch operations of 2 Kg each, which is a quantity for fully fueling a vehicle. In practice. It may be preferred to batch the 4 Kg of hydrogen gas among four-1 Kg reactors. Each reactor will also produce a substantial amount of high quality heat and electrical power, via a fuel cell, for the associated building structure.

EXAMPLE

Over a four-week cycle, a reactor 14 producing 2 Kg hydrogen per cycle will execute two cycles per week, to fuel normal driving needs (300-400 miles per week) of an FCV 20. Therefore the reactor 14 should be charged every month to execute 8 reaction cycles. To achieve these ends, the reactor 14 is charged with a 200 Kg quantity of molten Ga 62 and a 170 Kg quantity of aluminum feedstock 74. The reactor 14 has a removable top 78, allowing it to be charged with the solid aluminum feedstock 74 on site. Alternatively, the reactor 14 could be received on-site by delivery, every four weeks, fully charged, and inserted into the insulation jacket 58. The reactor 14 shown in FIG. 2 is removable by depressing detents 60 and removing the reactor 14 from the insulation jacket 58. The operation of the reactor is further explained as follows:

1. The water-splitting process begins by initially injecting 40 Kg of water reagent 64, in metered aliquots, into the reactor 14, via a hydraulic pump (not shown). The water-splitting reaction begins immediately and, within 20 minutes or less, 2 Kg of hydrogen 56 will be produced (20 Kg of aluminum feedstock 74 consumed per 40 Kg of water reagent).
2. When the pressure in the reactor 14 rises to 10,000 psi, a valve 80 opens and releases hydrogen 56 into a conditioning apparatus 22 (where the hydrogen is metered and dried) and then introduced into the fuel tank of the FCV 20. An interlock (not shown) assures that an FCV 20 is available to receive the generated hydrogen before water 64 is injected into the reactor 14.
3. The reaction will generate 88 Kilowatt hours (KWH) of heat energy which will be absorbed by the Ga fluid component 34 residing in the surrounding fluid jacket 36 and pumped thru heat exchangers inside a buried, insulated heat storage container 40. The heat exchangers (not shown) are comprised of approximately 10 meters of 1 cm diameter stainless steel piping coursing through the heat storage container 40. The heat exchanger will have a capacity to contain 4.6 Kg of heated, molten Ga 34 received from the fluid jacket 36 at any one time and release heat into the PCM, thus putting the heat storage container 40 in thermal communication with the reactor 14. An exemplary PCM is NaOH/7.2% $Na_2CO_3$, having a $\Delta H_f=340$ kJ/Kg, and having a fusion temperature of between 200° C. and 350° C. The heat storage container 40 contains one ton of PCM, which after receiving the heat transferred from the molten Ga fluid component 34, can retain this heat for a period of time. The one ton of PCM, when melted, retains enough heat to meet the heating and cooling needs of a normal-sized house for about a week.

The associated control system 82, comprising a computer, ensures that the temperature of the reactor 14 does not rise above the boiling point of water at any pressure or above a temperature of 350° C. when the pressure has reached its maximum of 10,000 PSI.

4. When the 2 Kg charge of hydrogen 56 has been transferred to the FCV 20, the state of the reactor 14 is that it has been depleted of 20 kilograms of solid aluminum feedstock 74, contains a volume of aluminum hydroxide slurry 68 as well as a residual amount of hydrogen 56, is pressurized to 10,000 psi and is at a temperature of 350° C.
5. Next, the retained hydrogen 56 remaining in the reactor 14 is released into a larger storage container 26—2 cubic feet, for example—but at a lower pressure (50 atmospheres) for use in feeding a fuel cell 28 for powering s building structure 32.
6. In accordance with the embodiment of the power generation system 10 shown in FIG. 3, the last step in the batch cycle is to expel the aluminum hydroxide slurry 68 through a valve 84 into a storage container 50 where alumina processing occurs. The 50 atmospheres of pressure of the retained hydrogen 56 inside of the reactor 14 forces the slurry 68 into the storage container 50 where intermediate pressure reduction and cooling occurs. The temperature of the slurry 68 being 350° C. is sufficient to dehydrate the water molecules out of the aluminum hydroxide, converting it into alumina ($AL_2O_3$). As the pressure decreases, the water in the slurry immediately converts to steam and rises into a cooler (not shown), leaving dry alumina. The dry alumina is transferred into a removable storage container 52. This completes the hydrogen-heat-alumina generation cycle.
7. Once the first cycle is completed, another 20 kilograms of aluminum 76 will dissolve from the solid aluminum feedstock 74 and saturate the 200 Kg quantity of passivating-oxide preventing reagent (molten Ga) 62 inside the reactor 14. A new water splitting reaction is started by introducing an aliquot of at least 40 kilograms of water reagent 64, plus an amount of excess water reagent sufficient to make up for the lost volume of the dissolved aluminum from the prior batch, and the cycle described above proceeds again.
8. After the entire charge of solid aluminum feedstock 74 has been consumed (e.g. after 8 cycles) the aluminum-depleted reactor is replaced with a fresh, fully charged reactor 14 as described above and the 4 week cycle begins again.

The reactor 14 noted in the previous example is loaded with a limited 4-week supply of metallic feed stock and once the feedstock is depleted, the reactor 14 must be reloaded with feedstock or else replaced with a new reactor vessel, pre-loaded with metallic feedstock. In the inventors' prior U.S. Pat. No. 9,056,769, incorporated herein by reference, a method for maintaining a water-splitting reaction was introduced wherein a "dry side" of a reaction vessel communicated with a "wet side". On the dry side a solid metal feedstock, such as aluminum was dissolved in a passivating-oxide preventing reagent, preferably molten Ga. The molten Ga occupied both the dry side and the wet side but only the wet side experienced the introduction of an oxygen-supplying reagent, such as water, to activate the water-splitting reaction. Later, in the inventors' co-pending U.S. patent application Ser. No. 14/514,777, incorporated herein by reference, the wet-side-dry-side reaction method was incorporated into a continuous hydrogen production method and associated systems which incorporated detailed wet-side-dry side reactors. The present invention could benefit from a wet-side-dry-side reactor in that such a reactor could remain in place and be fed with aluminum feedstock, as needed, for various hydrogen, and HVAC needs of an associated building structure and FCVs. With a wet-side-dry side reactor, a batch production process could still be maintained with the added benefit of not having to deliver and replace a new reactor vessel every four weeks. Only aluminum feedstock would need to be supplied, or kept on hand to supply the needs of the associated building structure. A yearly delivery of metal feedstock could be delivered on-site and used as-needed by the wet-side-dry side reactor. The other specifications of the power generation system described herein, would remain the same. Also, while a batch system is most applicable to a single building structure, or limited number of structures, the power generation system could be advanced to a continuous production wet-side-dry-side reactor and system to supply an entire neighborhood of houses, a large office park, or high-rise building.

The heat generated by the reactor and stored in the heat storage container during each batch phase can be coupled to a variety of HVAC systems that would distribute heat (or cooling) through any of a variety of commercial heat exchangers, such as forced air or steam or cooling via absorption systems, and further distributing hot water to the associated building structure. Hydrogen which is produced in excess of that required for the vehicle fueling application, can be stored for use by a fuel cell and used to provide electric power for the facility. In essence, this one reactor station can provide all of the vehicle and home energy needs of a family, completely unconnected to the power grid. The above description is for an example of the cyclic operation of a specific size aluminum-gallium reactor. The process can be easily modified to scale up or down from a single use container producing only a limited amount of hydrogen to a large reactor or gang of reactors serving a larger facility. Also, the reagents and feedstock could be modified by those skilled in the art to create different products from the water splitting process. For example, the oxygen-supplying reagent could be water, as described herein, or it could be hydrogen peroxide, to name another common example. The solid aluminum feedstock could be substituted with magnesium, which, after processing the slurry from the reactor could produce magnesium oxide as a valuable end-product.

Finally, although the description above contains much specificity, this should not be construed as limiting the scope of the invention, but as merely providing illustrations of some of the presently preferred embodiments of this invention. This invention may be altered and rearranged in numerous ways by one skilled in the art without departing from the coverage of any patent claims, which are supported by this specification.

The invention claimed is:

1. A selectively locatable power generation system employing a water-splitting reaction process, comprising:
   a reactor fueled by aluminum feedstock and executing a water-splitting reaction producing hydrogen, aluminum hydroxide and heat;
   a hydrogen storage container being coupled to said reactor, said hydrogen storage container receiving hydrogen under pressure from said reactor, said hydrogen storage container being coupled to a fuel cell, said fuel cell converting hydrogen received from said hydrogen storage container into electrical power;
   said reactor generating hydrogen at high-pressure and upon reaching a high-pressure threshold, said hydrogen exiting said reactor and entering a conditioning apparatus, said conditioning apparatus conditioning said high-pressure hydrogen for introduction into a fuel cell vehicle;
   a fluid jacket in communication with said reactor, said water splitting reaction of said reactor transferring heat to said fluid jacket, said fluid jacket comprising a fluid component, said fluid component absorbing said transferred heat from said water-splitting reaction;
   a heat storage container in thermal communication with said fluid jacket, said heat storage container absorbing and storing heat transferred from said fluid component; and
   a water source, said water source being coupled to said reactor, said water source introducing water into said reactor to carry out said water-splitting reaction.

2. The selectively locatable power generation system as recited in claim 1, further comprising a building structure, said building structure further comprising an HVAC system coupled to said heat storage container, said HVAC system using stored heat from said heat storage container to heat or cool said building structure.

3. The selectively locatable power generation system as recited in claim 2, further comprising a fuel cell vehicle refueling station associated with said building structure, said fuel cell vehicle refueling station being coupled to said conditioning apparatus, said conditioning apparatus sending conditioned hydrogen to said fuel cell vehicle refueling station.

4. The selectively locatable power generation system as recited in claim 1, wherein said fluid component of said fluid jackets is 100% by weight molten gallium.

5. The selectively locatable power generation system as recited in claim 1, wherein said fluid component achieves a temperature in the range of between 200°-350° C.

6. The selectively locatable power generation system as recited in claim 1, wherein said heat storage container further comprises phase change material.

7. The selectively locatable power generation system as recited in claim 6, wherein said phase change material is comprised of NaOH/7.2% Na2CO3.

8. The selectively locatable power generations system as recited in claim 1, further comprising an alumina processor, said alumina processor receiving a quantity of aluminum hydroxide from said reactor, said alumina processor converting said aluminum hydroxide to alumina.

9. A selectively locatable power generation system, comprising:
   a reactor executing a reaction to produce hydrogen, aluminum hydroxide and heat, the reactor further comprising:
   a) a dry side containing a passivating-oxide preventing reagent;
   b) a solid aluminum feedstock, the solid aluminum feedstock being submerged in the passivating-oxide preventing reagent on the dry side until the aluminum feedstock dissolves into and saturates the passivating-oxide preventing reagent on the dry side;
   c) a wet side in communication with the dry side, the wet side receiving the aluminum-saturated passivating-oxide preventing reagent from the dry side; and
   d) an oxygen supplying reagent being introduced to the wet side to create a reaction between the oxygen supplying reagent and the aluminum-saturated passivating-oxide preventing reagent at an interface of the aluminum-saturated passivating-oxide preventing reagent and the oxygen supplying reagent, the reaction producing hydrogen gas, heat and aluminum hydroxide components;
   a hydrogen storage container being coupled to said reactor, said hydrogen storage container receiving hydrogen under pressure from said reactor, said hydrogen storage container being coupled to a fuel cell, said fuel cell converting hydrogen received from said hydrogen storage container into electrical power;
   said reactor generating hydrogen at high-pressure and upon reaching a high-pressure threshold, said hydrogen exiting said reactor and entering a conditioning apparatus, said conditioning apparatus conditioning said high-pressure hydrogen for introduction into a fuel cell vehicle; and
   a heat storage container in thermal communication with said reactor.

10. The selectively locatable power generation system as recited in claim 9, further comprising a building structure, said building structure further comprising an HVAC system coupled to said heat storage container, said HVAC system using stored heat from said heat storage container to heat or cool said building structure.

11. The selectively locatable power generation system as recited in claim 9, further comprising a fuel cell vehicle refueling station associated with said building structure, said fuel cell vehicle refueling station being coupled to said conditioning apparatus, said conditioning apparatus sending conditioned hydrogen under high pressure to said fuel cell vehicle refueling station.

12. The selectively locatable power generation system as recited in claim 11, wherein said hydrogen is pressurized up to 10,000 psi.

13. The selectively locatable power generation system as recited in claim 9, wherein said molten heated passivating oxide-preventing reagent is selected from the group consisting of a molten gallium consisting of essentially of about 100% (hundred percent) by weight; a liquid melt gallium alloy consisting essentially of about 80% (eighty percent) gallium and 20% (twenty percent) indium (80/20 Ga/In); or a liquid melt gallium alloy consisting essentially of about 68% (sixty-eight percent) gallium, 22% (twenty-two percent) indium and 10% (ten percent) tin by weight.

14. The selectively locatable power generation system as recited in claim 9, wherein said molten heated passivating oxide-preventing reagent from said reactor achieves a temperature in the range of 200°-350° C.

15. The selectively locatable power generation system as recited in claim 9, wherein said heat storage container further comprises phase change material.

16. The selectively locatable power generation system as recited in claim 15, wherein said phase change material is comprised of NaOH/7.2% Na2CO3.

17. The selectively locatable power generation system as recited in claim 9, further comprising a water source as said oxygen-supplying reagent, said water source being coupled to said wet side of said reactor.

18. The selectively locatable power generations system as recited in claim 9, further comprising an alumina processor, said alumina processor being coupled to said reactor, said alumina processor receiving a quantity of aluminum hydroxide from said reactor, said alumina processor converting said aluminum hydroxide to alumina.

19. The selectively locatable power generations system as recited in claim 9, further comprising wherein the wet side is in fluid communication with the dry side, the reaction on the wet side consuming the aluminum of the aluminum-saturated passivating-oxide preventing reagent and creating a gradient of aluminum-saturated in the passivating-oxide preventing reagent, wherein the passivating-oxide preventing reagent on the dry side is more saturated with aluminum than the passivating-oxide preventing reagent on the wet side, this gradient causing the aluminum to flow from the dry side to the wet side.

20. A selectively locatable power generation system, comprising:
    a reactor fueled by a solid metal feedstock and executing a reaction producing hydrogen, metal hydroxide and heat;
    a hydrogen storage container being coupled to said reactor, said hydrogen storage container receiving hydrogen from said reactor, said hydrogen storage container being coupled to a fuel cell, said fuel cell converting hydrogen received from said hydrogen storage container into electrical power;
    said reactor generating hydrogen at high-pressure sufficient for supplying a fuel cell vehicle hydrogen fuel needs;
    a heat storage container in thermal communication with said reactor;
    an HVAC system coupled to said heat storage container, said HVAC system using stored heat from said heat storage container to heat or cool a building structure; and
    a source of oxygen-supplying reagent, said source being coupled to said reactor, said source introducing oxygen-supplying reagent into said reactor as a component of a reaction producing hydrogen, metal hydroxide and heat.

21. The selectively locatable power generation system of claim 20, wherein said solid metal feedstock is selected from the group consisting of aluminum or magnesium.

22. The selectively locatable power generation system of claim 21, wherein said metal hydroxide is converted to UHP alumina or UHP MgO.

23. A building structure powered by the power generation system of claim 20.

24. The building structure of claim 23, further comprising a fuel cell vehicle refueling station associated with said building structure.

* * * * *